(12) United States Patent
Salvato

(10) Patent No.: US 7,726,576 B2
(45) Date of Patent: *Jun. 1, 2010

(54) ROTATABLE/REMOVABLE KEYBOARD

(75) Inventor: Dominick H. Salvato, North Salem, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 193 days.

This patent is subject to a terminal disclaimer.

(21) Appl. No.: 11/676,478

(22) Filed: Feb. 19, 2007

(65) Prior Publication Data

US 2007/0138290 A1 Jun. 21, 2007

Related U.S. Application Data

(63) Continuation of application No. 10/748,991, filed on Dec. 29, 2003, now Pat. No. 7,185,818.

(51) Int. Cl.
G06K 7/10 (2006.01)
(52) U.S. Cl. .................................. 235/472.01
(58) Field of Classification Search ............. 235/472.01
See application file for complete search history.

(56) References Cited

U.S. PATENT DOCUMENTS

| | | | |
|---|---|---|---|
| 5,103,376 A | | 4/1992 | Blonder |
| 5,386,106 A | | 1/1995 | Kumar |
| 5,389,745 A | | 2/1995 | Sakamoto |
| 5,416,463 A | | 5/1995 | Higgins et al. |
| 5,536,930 A | * | 7/1996 | Barkan et al. .......... 235/472.01 |
| 5,565,671 A | | 10/1996 | Kirkeby et al. |
| 5,679,943 A | | 10/1997 | Schultz et al. |
| 5,794,164 A | * | 8/1998 | Beckert et al. ............. 455/3.06 |
| 5,857,157 A | * | 1/1999 | Shindo ........................ 455/551 |
| 5,898,161 A | * | 4/1999 | DeVita et al. .......... 235/472.01 |
| 5,936,619 A | * | 8/1999 | Nagasaki et al. ............ 345/205 |
| 6,004,049 A | | 12/1999 | Knox |
| 6,118,432 A | | 9/2000 | Kotorov et al. |
| 6,212,066 B1 | | 4/2001 | Fetterman |
| 6,320,743 B1 | | 11/2001 | Jin et al. |
| 6,373,501 B1 | | 4/2002 | Fiero |
| 6,418,325 B1 | | 7/2002 | Reber et al. |
| 6,431,450 B1 | | 8/2002 | Lundahl et al. |
| 6,433,791 B2 | * | 8/2002 | Selli et al. .................... 345/659 |
| 6,499,052 B1 | | 12/2002 | Hoang et al. |
| 6,593,914 B1 | * | 7/2003 | Nuovo et al. ................. 345/169 |
| 6,646,626 B1 | * | 11/2003 | Uskali et al. ................... 345/87 |
| 6,658,268 B1 | * | 12/2003 | Bodnar et al. ............. 455/556.2 |
| 6,788,621 B2 | | 9/2004 | Meylan et al. |

(Continued)

OTHER PUBLICATIONS

Office Action in related U.S. Appl. No. 10/748,992 dated Aug. 9, 2005.

(Continued)

*Primary Examiner*—Seung H Lee
*Assistant Examiner*—Christle I Marshall

(57) ABSTRACT

A system that facilitates desirable orientation of a display on a machine data reader comprises a keypad that is moveable with respect to a body of the machine data reader, the keypad utilized to relay information to the machine data reader. The system further comprises a component that senses a position of the keypad, and a component that orients the display based at least in part upon the sensed position of the keypad.

19 Claims, 12 Drawing Sheets

U.S. PATENT DOCUMENTS

| | | | |
|---|---|---|---|
| 6,839,576 | B2 | 1/2005 | Aagaard et al. |
| 7,072,688 | B2 * | 7/2006 | Bodnar et al. ............ 455/556.2 |
| 7,577,462 | B2 * | 8/2009 | Kumar ....................... 455/557 |
| 2002/0061770 | A1 | 5/2002 | Ozaki |
| 2003/0044000 | A1 * | 3/2003 | Kfoury et al. .......... 379/433.04 |
| 2003/0064751 | A1 | 4/2003 | Charlier et al. |
| 2003/0080880 | A1 | 5/2003 | Kaino et al. |
| 2004/0095326 | A1 | 5/2004 | Anderson |
| 2004/0132492 | A1 | 7/2004 | Engstrom et al. |
| 2004/0142734 | A1 | 7/2004 | Kim |
| 2004/0183834 | A1 | 9/2004 | Chermesino |
| 2004/0227733 | A1 | 11/2004 | Fyke et al. |
| 2004/0245334 | A1 * | 12/2004 | Sikorski ..................... 235/383 |
| 2005/0070324 | A1 | 3/2005 | Chadha |
| 2005/0091431 | A1 | 4/2005 | Olodort et al. |
| 2006/0098116 | A1 * | 5/2006 | Manico et al. .............. 348/373 |

OTHER PUBLICATIONS

Office Action in related U.S. Appl. No. 10/748,992 dated Mar. 10, 2006.
Office Action in related U.S. Appl. No. 10/748,992 dated Jun. 26, 2006.
Advisory Action in related U.S. Appl. No. 10/748,992 dated Aug. 25, 2006.
Office Action in related China patent application 200410099776.X dated Sep. 7, 2007.
Office Action in related China patent application 20041009976.X dated Aug. 1, 2008.

* cited by examiner

ROTATABLE/REMOVABLE KEYBOARD

CROSS-REFERENCE TO RELATED APPLICATIONS

This application is a continuation of U.S. patent application Ser. No. 10/748,991, filed Dec. 29, 2003, entitled "ROTATABLE/REMOVEABLE KEYBOARD". The entireties of the aforementioned applications are incorporated herein by reference.

TECHNICAL FIELD

The present invention generally relates to displays in barcode scanners, and more particularly relates to display orientation relative to a keypad/keyboard position

BACKGROUND OF THE INVENTION

Barcode scanners are known to be effective tools in sales environments. Prior to barcode scanners, labels (e.g., numbers, letters, or a combination thereof) were placed upon individual products that identified such products. A compilation of the labels and their corresponding products was utilized by a salesperson to determine which items were being sold in order to accurately determine inventory. Upon arrival of new products to the sales establishment, a new compilation of labels and products required generation to effectively determine available inventory. For example, each new product was manually counted and typically entered into a table. A summation of the products was added to remaining products having substantially similar labels. Compiling inventory data included laboriously reviewing products and labels and creating a table that illustrated a number of products represented by particular labels. Such a system is time consuming and susceptible to human error, as labels can be easily misread or entered incorrectly into a table.

Barcode scanners were introduced to help mitigate some of the above deficiencies related to inventory maintenance. Each product was delivered with a barcode (e.g., a graphical object that encodes information as alternating dark and light portions) that identified a particular product. Via scanning the barcodes of products sold, products could automatically be deducted from inventory through utilization of a barcode scanner and a computing component. Furthermore, products brought to a particular store could be scanned and automatically added to a list of inventory. However, those barcode scanners were stationary due to their size. Thus double-checking inventory still required manually counting products in the sales area. Furthermore, entering products into an inventory database required moving products to an area with a barcode scanner.

Today, barcode scanners have a wide range of applications. For instance, examples of barcode scanners can be found in almost every department store, grocery store, and convenience store and are utilized in connection with selling products (e.g., price determination) and maintaining inventory. Furthermore, barcodes and barcode scanners are currently employed in factory and warehouse settings that utilize barcodes in connection with inventory and production control. Moreover, barcodes have been added to drivers' licenses and other identification cards, wherein the barcodes contain data relating to the person being identified (e.g., age, height, weight, birth date, . . . ). As technology has advanced, barcode scanners have become portable and include memory and a display. For example, a couple engaged to be married can go to a department store to generate a gift registry and simply be given a portable barcode scanner. Thereafter, the couple can scan items that they wish to be added to their registry, and a display within the barcode scanner will illustrate which item(s) they have added. Moreover, typical barcode scanners are equipped with memory that can store the registry list, which can later be transferred to a more permanent data store.

Wearable barcode scanners have also been developed, wherein a user that typically requires use of both hands can still utilize a barcode scanner. For example, the barcode scanner can be associated with a strap that wraps around a user's arm and secures such barcode scanner to the arm. Therefore, the user has ability to use both arms when the employment of the barcode scanner is not required. These wearable barcode scanners, however, are designed to be worn on a particular arm, as a keypad for entering data into the barcode scanner is associated with such scanner. However, if a user desires to utilize the scanner on the other arm, the keys and display will be approximately 180 degrees displaced from a desirable orientation. Furthermore, a user utilizing the keypad will have at least part of the display blocked by a hand when the barcode scanner is not on an arm that the scanner was particularly designed for. These barcode scanners are subject to errors in entering and/or reviewing data, as the keypad is not desirably oriented and a display can be partially blocked and/or not oriented desirably.

In view of at least the above, there exists a strong need in the art for a system and/or methodology that enables a keypad and display to be adjusted as desirably by a user.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention facilitates orientation of a display upon a machine data reader (e.g., a barcode scanner) based at least in part upon a user-defined orientation of a moveable keypad. Therefore, the present enables a keypad and display to be oriented desirably to a user when attempting to enter data into the machine data reader as well as read data from the display of the machine data reader. For example, the machine data reader can be a wearable barcode scanner that can be attached to either arm of a user. A first user can attach the barcode scanner to a left arm and orient the keypad to render characters on the keypad to read desirably (e.g., left-to-right and top-to-bottom). Such orientation of the keypad with respect to a body of the barcode scanner is sensed by a keypad position sensor, and a display on the barcode scanner is oriented correspondingly. For instance, the display can also read left-to-right and top-to-bottom. Thereafter, a disparate user can desirably wear the barcode scanner on a right arm. Utilizing conventional wearable barcode scanners would require the user to read characters on the keypad at a rotation of 180 degrees from a desirable viewing angle and/or cause at least a partial obstruction of the display when entering data via the keypad. The present invention enables the keypad to be rotated to a desirable orientation with respect to the body of the barcode scanner, and the display will be rotated accordingly. This alleviates readability problems in connection with the keypad and display, and further mitigates obstruction that can occur in connection with entering data on a wearable barcode scanner.

In accordance with another aspect of the present invention, the machine data reader can have a detachable face, wherein the detachable face includes a moveable keypad and a display. This would be desirable in instances that a display and/or keypad are desirably positioned with respect to a scanning component (e.g., a light-emitting and/or light-receiving component). The detachable face can be removed from the machine data reader and re-attached at a disparate orientation. Thereafter, the moveable keypad can likewise be oriented desirably with respect to the body of the machine data reader and the detachable face. Sensing components can be provided to sense an orientation of both the detachable face and the moveable keypad, and the display can be rendered based at least in part upon the sensed orientation of both the detachable face and the moveable keypad.

In accordance with another aspect of the present invention, the machine data reader can further include keys that are not translatable with respect to a body of the machine data reader. Thus, while the keypad can be moved with respect to the machine data reader, these other keys cannot be translated. Such keys can be utilized to turn power on/off, scroll through menus on the display, and various other suitable functions. The functionality of the keys, however, can be altered based upon an orientation of the moveable keypad. For example, when the moveable keypad is in a first position one of the non-moveable keys can be employed to scroll upward through a menu, and when the moveable keypad is in a second position the non-moveable key can be employed to scroll downward through the menu.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
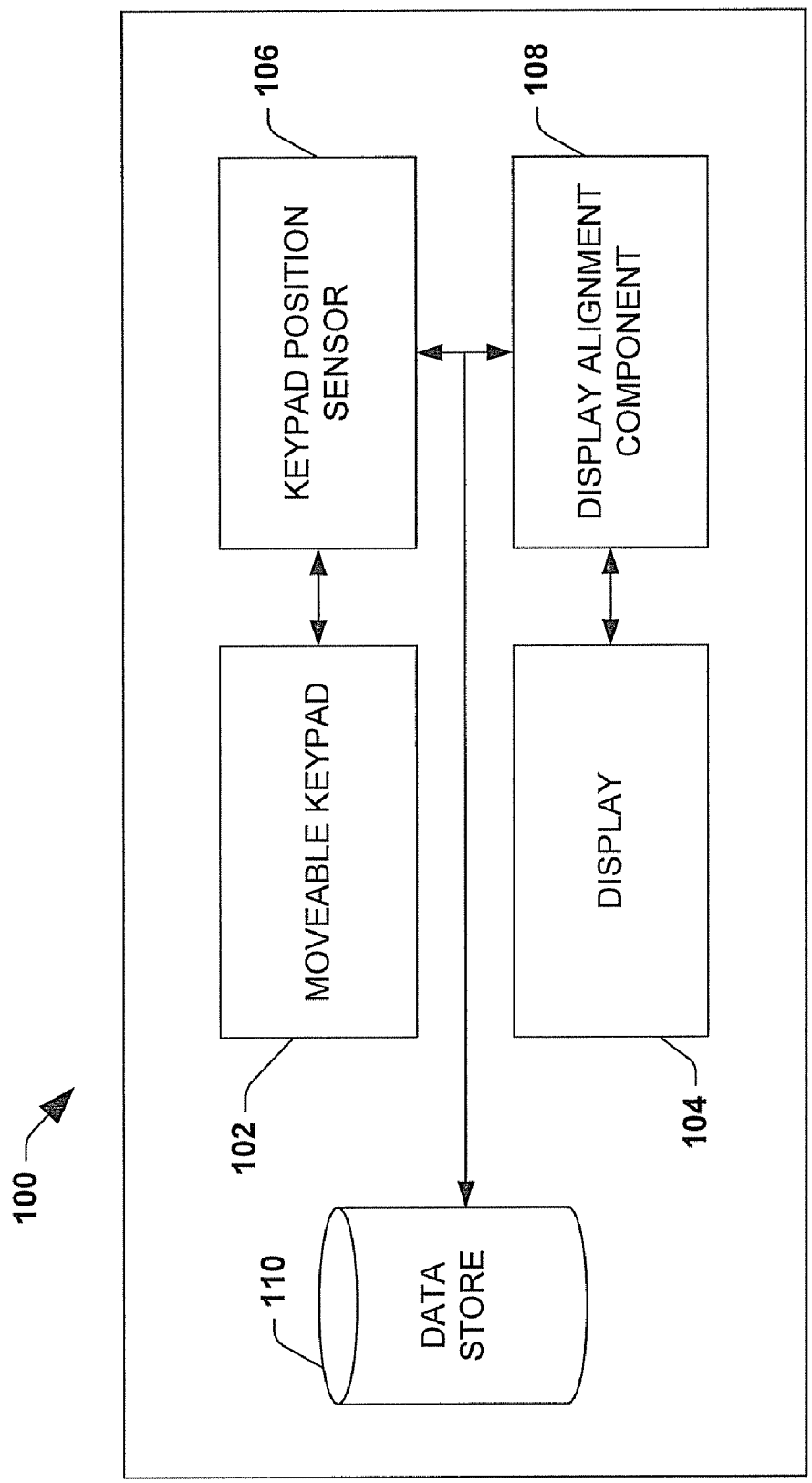
FIG. 1 is a block diagram of a system that facilitates desirable orientation of a keypad and screen of a barcode scanner in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Turning now to FIG. 1, a high-level functional diagram of a system 100 that facilitates desirable orientation of a keypad and display of a portable barcode scanner is illustrated. While, a barcode scanner is discussed for purposes of explanation, it is understood that other wearable data reading devices are contemplated and can be utilized in connection with the present invention. For example, contact and/or contactless I/C readers can utilize the system 100, and such devices are intended to fall within the scope of the hereto-appended claims. The system 100 mitigates errors that are associated with utilizing conventional portable barcode scanners in connection with scanning items and entering data into such barcode scanner. For instance, the system 100 comprises a moveable keypad 102 that can be placed in a position desirable to the user to enable easy data entry without blocking a display 104.

The moveable keypad 102 enables a user to enter data related to items (e.g., consumer products, parts employed in a factory setting, identification cards) comprising barcode symbols that are desirably scanned. Furthermore, the moveable keypad 102 can be placed in a position that enables a user to most effectively enter information into a barcode scanner (or other machine data reader). In accordance with one aspect of the present invention, the moveable keypad 102 can be completely removed from a face of the barcode scanner, and then repositioned at a disparate orientation. For instance, the moveable keypad 102 can be positioned at a 180-degree rotation from an initial position. Such a change in position can be desirable when the barcode scanner is a wearable barcode scanner that is first strapped to a user's right arm, and thereafter the wearable barcode scanner is desirably strapped to a disparate user's left arm (e.g., one user may be left handed while the other use is right-handed). Furthermore, a same user may desire to wear the wearable barcode scanner on disparate arms given particular different applications. The moveable keypad 102 thus enables a user to enter information germane to an application requiring the barcode scanner with the moveable keypad 102 in a position desirable to the user. In accordance with another aspect of the present invention, the moveable keypad 102 can be rotated without being removed from a face of the barcode scanner. Such an aspect provides for precise customization of position of the moveable keypad 102 according to user preference. A mechanism (not shown) that locks the moveable keypad 102 in a position desirable to a user can also be provided to prevent the moveable keypad 102 from shifting to an undesirable position.

The system 100 further comprises a keypad position sensor 106 that senses a particular position of the moveable keypad 102. In accordance with one aspect of the present invention, the keypad position sensor 106 can determine position of the moveable keypad 102 via monitoring a physical connection between a face of the barcode scanner and the moveable keypad 102. For example, if the moveable keypad 102 at a first orientation is physically disconnected from the barcode scanner and thereafter reconnected at a second orientation, a difference in physical connection will exist between the moveable keypad 104 and the barcode scanner at the first and second orientation. The keypad position sensor 106 can thus determine an orientation of the moveable keypad 102 based upon a physical connection. In accordance with another aspect of the present invention, the keypad position sensor 106 can utilize levels or other suitable position sensors in connection with determining a position of the moveable keypad 104.

The system 100 further comprises a display alignment component 108 that aligns the display 104 based at least in part upon a position of the moveable keypad 102 sensed by the keypad position sensor 106. Thus, for example, if the moveable keypad 102 is previously detached from the barcode scanner, upon attaching such moveable keypad 102 in a particular position the display alignment component 108 will render the display 104 to an orientation that corresponds to the particular position of the moveable keypad 102. If the moveable keypad 102 can be rotated without requiring removal, then the display alignment component 108 can dynamically alter the display so that it corresponds to a current position of the moveable keypad 102. The system 100 can further comprise a data store 110 that can store information related to rendering the display 102. For instance, a user may customize orientations of the display 102 corresponding to particular positions of the moveable keypad 102, and such customization information can be stored in the data store 110. The data store 110 can also be employed to store information related to items scanned (e.g., product identification information, price information, inventory information, . . . ).

A portable barcode scanner employing the system 100 can operate in a substantially similar manner that a conventional barcode scanner operates. For instance, the barcode scanner can scan linear barcodes as well as two-dimensional barcodes, and other high-density symbologies (e.g., PDF417 symbologies). Still other symbologies have been developed in which the symbol is comprised of a matrix array made up of hexagonal, square, polygonal and/or other geometric shapes. All these and other substantially similar symbologies are contemplated by the present invention. For instance, a device that can read contact and/or contactless IC technologies is contemplated by the present invention.

Figure 2:
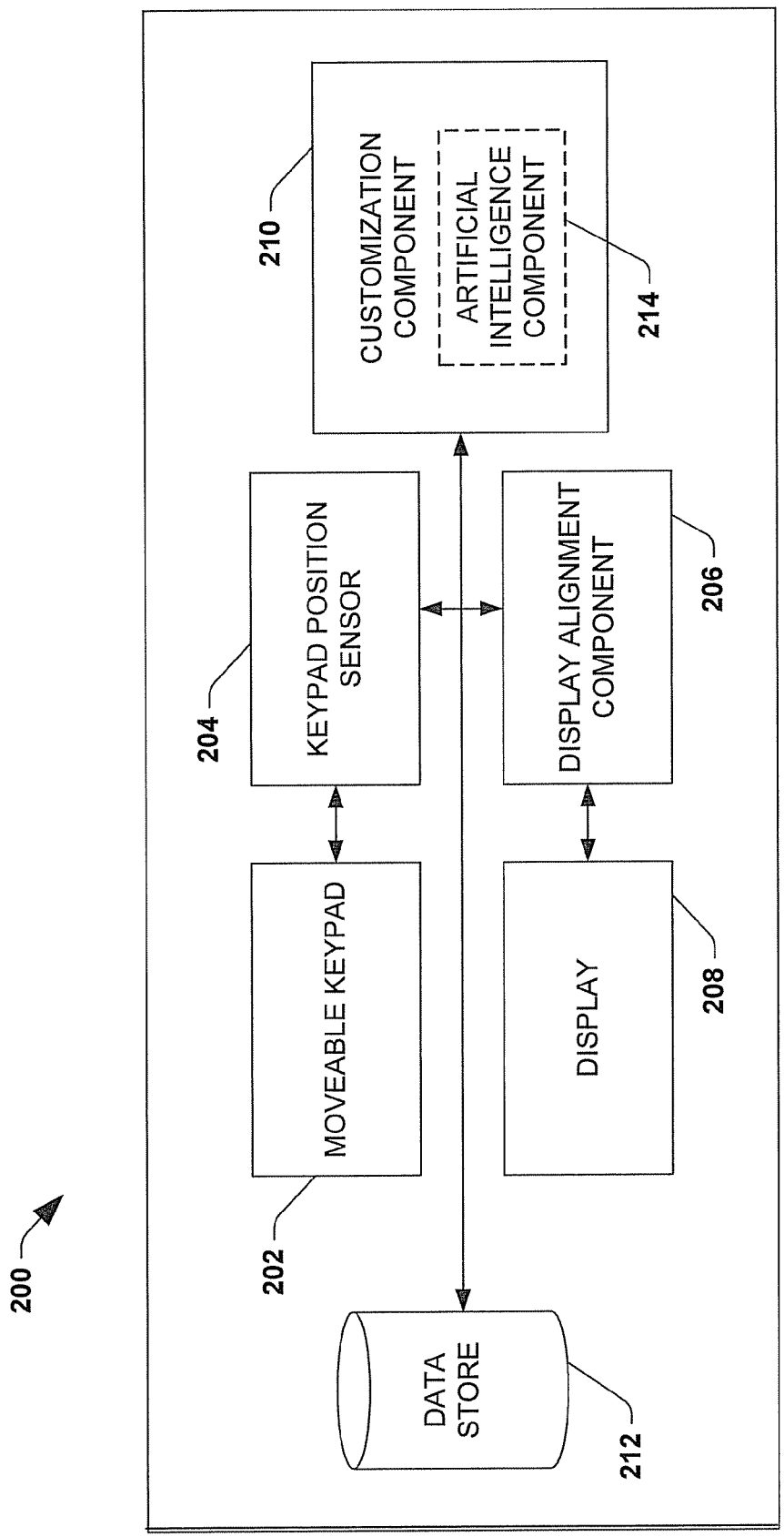
FIG. 2 is a block diagram of a system that facilitates desirable orientation of a keypad and screen of a barcode scanner in accordance with an aspect of the present invention.

Now referring to FIG. 2, a system 200 that facilitates optimal orientation of a keypad and a display included within a barcode scanner or other suitable machine data reader is illustrated. The system 200 includes a moveable keypad 202 that can be rotated from an initial position to a desirable position given a particular user application. For example, if a user desires to translate a wearable barcode scanner from a right arm to a left arm, the moveable keypad 202 can be translated to a position of desirable orientation. Furthermore, the moveable keypad 202 can be removed from a face of a barcode scanner or other suitable machine data reader and re-connected to the barcode scanner in with a desirable orientation of the moveable keypad 202 to the user. The system 200 further includes a keypad position sensor 204 that determines an orientation of the moveable keypad 202. A display alignment component 206 automatically aligns a display 208 to a desirable orientation given a position of the moveable keypad 202. Thus, the moveable keypad 202 and the display 208 are positioned to effectuate efficient entry of information into a barcode scanner via the moveable keypad 202 as well as efficient review of keypad entries and reception of information via the display. As the moveable keypad 202 and the display 208 are aligned according to user-preference, errors in receiving and entering information relating to a barcode scanner or other suitable machine data reader will be mitigated. Moreover, as the moveable keypad 202 can be rotated, a user's hand will not partially block the display 208 upon entering information.

The system 200 further includes a customization component 212 that provides for customization of a rendering of the display 208 given a particular location and/or application of the moveable keypad 202. For example, a user may desire that a particular location of the moveable keypad 202 correspond to a particular rendering of the display 208. Furthermore, the customization component 210 can be employed in connection with customizing resolution of the display 208 and/or font size of the display 208 in accordance with an aspect of the present invention. For instance, if scanning of a particular item requires a user to extend his hand (and thus the barcode scanner) a particular distance, it may be desirable for letters within the display 208 to be enlarged. The user can utilize the customization component 210 to ensure that text and/or images within the display 208 are displayed desirably in connection with a particular application and position of the moveable keypad 202. Furthermore, the customization component 210 can access a data store 212 to retrieve user profiles that are stored therein. The user profiles can contain information relating to user-preferences, user applications, and various other user information that can be employed in connection with generating an optimal display. Disparate users can thus utilize a single barcode scanner (or other suitable machine data reader) and have access to individualized user preferences relating to orientation and/or imagery of the display 208 given a position of the moveable keypad 202.

Furthermore, the customization component 210 can be associated with an artificial intelligence component 214 in connection with providing a user with a most desirable display 208 given a position of the moveable keypad 202. For instance, the artificial intelligence component 214 can be employed to infer a screen resolution, text size, imagery, and/or display orientation based at least in part upon a position of the moveable keypad 202 and user-related variables (e.g., time of day, typical application a user at a time of day, typical desirable orientation given a position of the moveable keypad, . . . ). Furthermore, the artificial intelligence component 214 can monitor activities and render and appropriate display based upon sensed position of the moveable keypad and user identification, user history, current application, etc. For example, Bayesian belief systems, fuzzy logic, neural networks, and other suitable "intelligent" algorithms can be employed in connection with the artificial intelligence component 214. Furthermore, the data store 212 can retain data relating to individuals and or variables that the artificial intelligence component 214 utilizes to make decisions regarding properties of the display 208 given a particular position of the moveable keypad 202.

Figure 3:
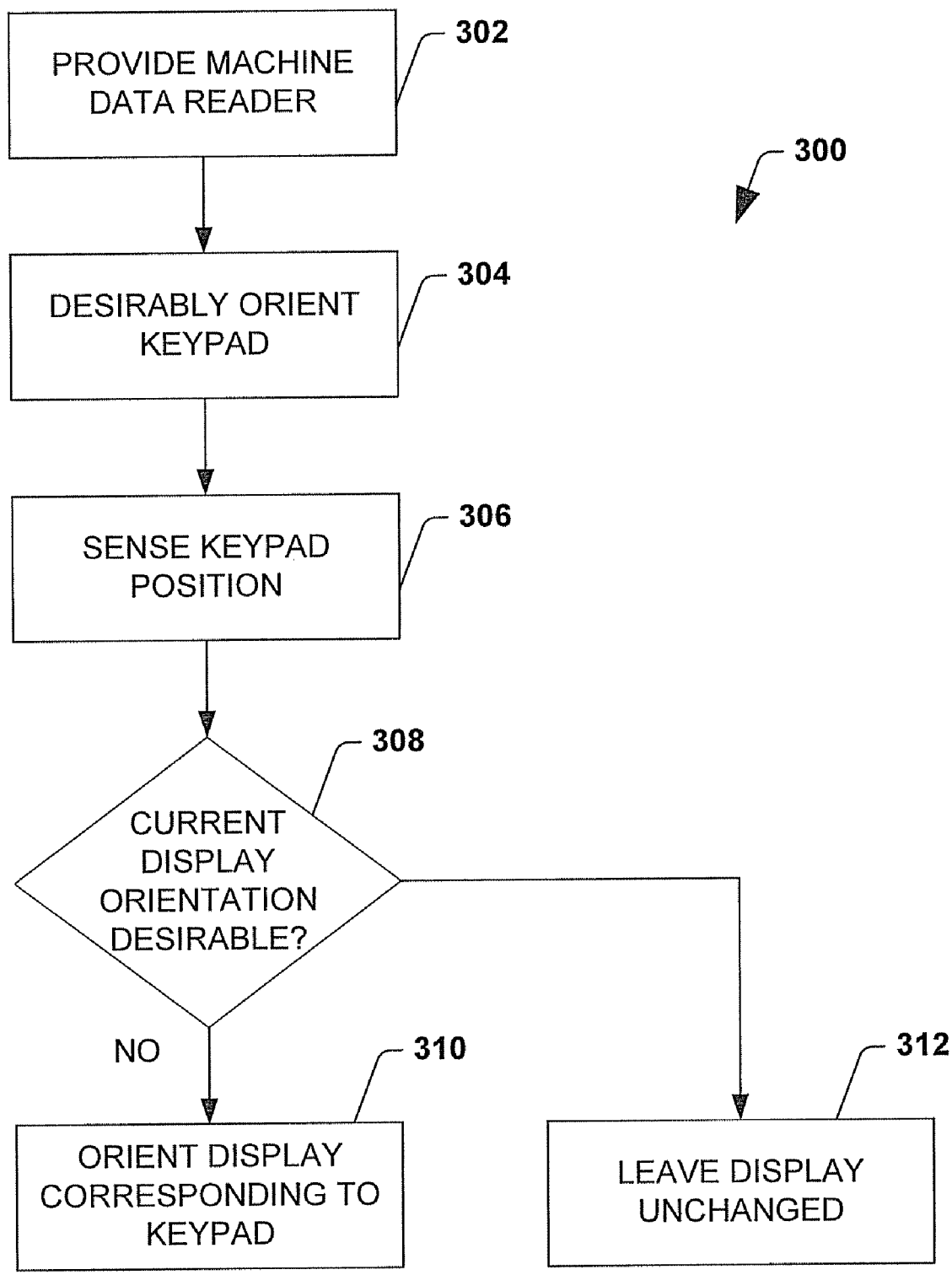
FIG. 3 is a flow diagram illustrating a methodology for desirably orientating a screen based at least in part upon keypad position in accordance with an aspect of the present invention.

Referring now to FIG. 3, a methodology 300 for orienting a display of a machine data reader given a particular position of a keypad associated with such machine data reader is illustrated. While, for purposes of simplicity of explanation, the methodology 400 is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 302, a portable machine data reader is provided. For example, the machine data reader can be a barcode scanner, a device that can read contact and/or contactless IC data, etc. Furthermore, the machine data reader can be an integration of two or more devices that can read various symbologies and/or encoded data. For example, the machine data reader can be an integration of a barcode scanner and a magnetic stripe reader. Such integrations of two or more devices are contemplated by the present invention and are intended to fall within the scope of the hereto-appended claims.

At 304, a moveable keypad is desirably oriented. In accordance with one aspect of the present invention, the keypad can be physically disconnected from the machine data reader and thereafter connected to the machine data reader in a desirably orientation. In accordance with another aspect of the present invention, the keypad can be rotated without requiring physically disconnecting the keypad from the machine data reader. Furthermore, a locking mechanism can be provided to ensure that the keypad does not translate from a desirable orientation.

At 306, a position of the keypad is sensed. For instance, disparate physical connections between the keypad and the machine data reader can indicate disparate positions. Furthermore, levels and other suitable position sensors associated with the keypad can be employed to determine an orientation of the keypad with respect to the barcode scanner. At 1308 a determination is made regarding whether the current display orientation is desirable. At 1310 the display is automatically oriented to an appropriate position based upon the keypad position if the current display orientation is undesirable. If the current display orientation was found to be desirable at 1308, then at 312 the display is not altered. Thus, the keypad and the display will be oriented according to user preference to effectuate mitigation of errors associated with reviewing the display and entering information into the machine data reader via the keypad.

Figure 4:
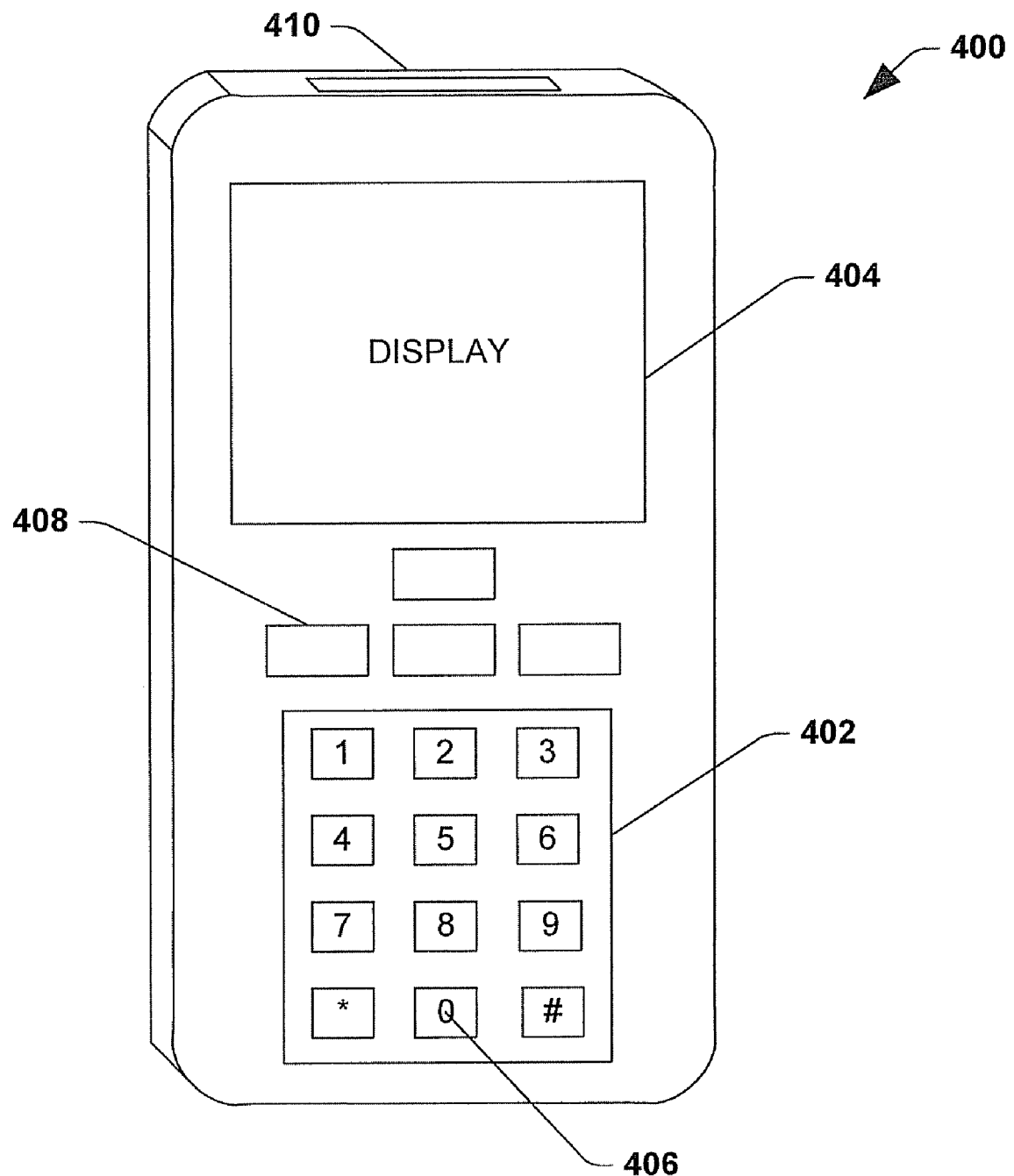
FIG. 4 illustrates an exemplary machine data reader that can be employed in connection with the present invention.
Figure 5:
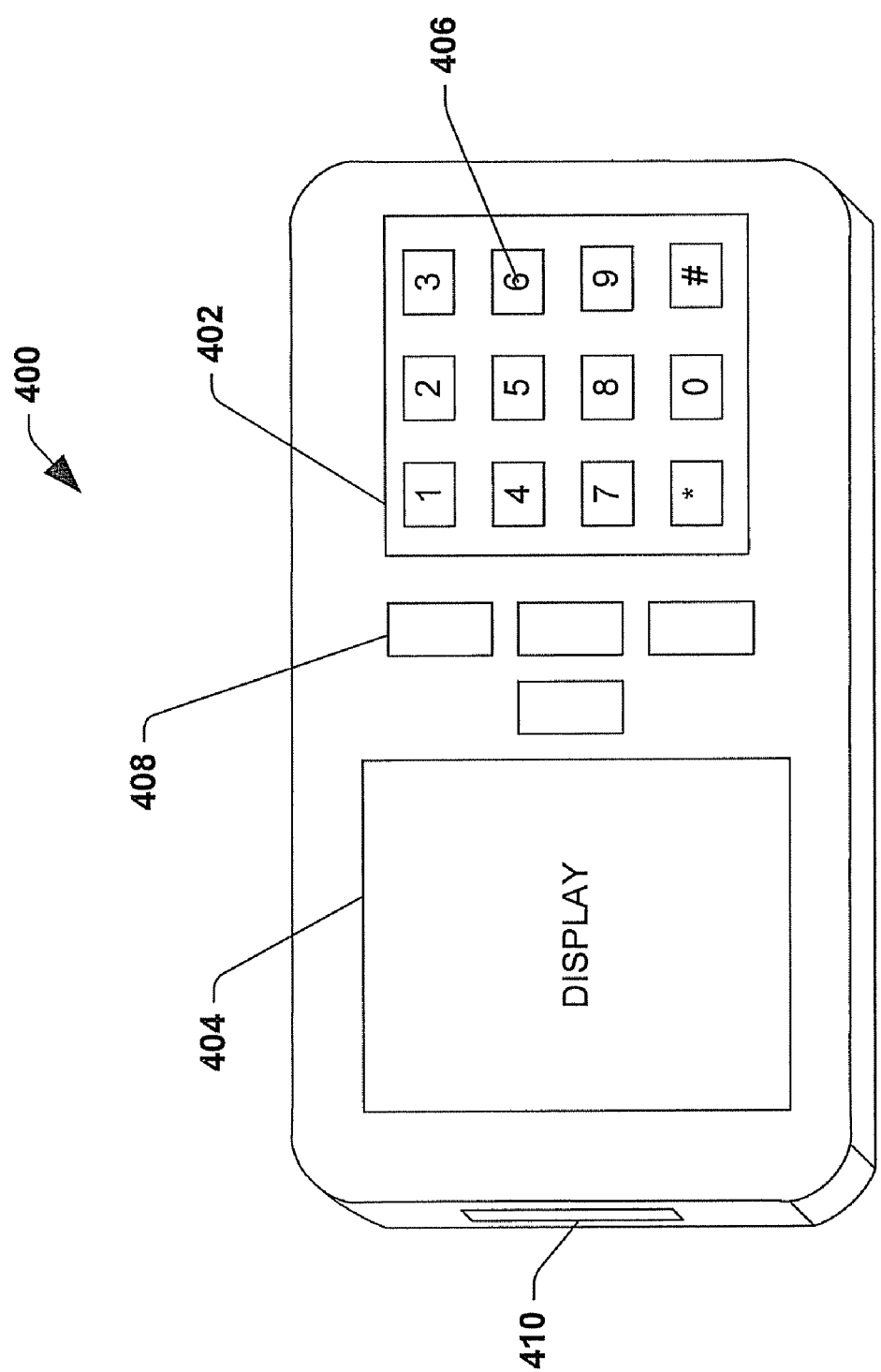
FIG. 5 illustrates an exemplary machine data reader that can be employed in connection with the present invention.

Now referring to FIG. 4, an exemplary machine data reader 400 that can be employed in connection with the present invention is illustrated. The machine data reader 400 includes a moveable keypad 402 and a display 404, wherein the display 404 is oriented based at least in part upon an orientation of the moveable keypad 402. The moveable keypad 402 further includes various keys 406 that can be utilized to enter information into the machine data reader. Other keys 408 that cannot be translated to disparate positions are also provided to enable further entering of information. For instance, the keys 408 can be keys that enable a user to scroll through a list. Furthermore, the keys 408 can include a power key and other various keys that effect operability of the machine data reader 400. A scanning component 410 is provided on an upper portion of the machine data reader 400, wherein the scanning component 410 facilitates scanning of barcode symbols and the like. In this exemplary figure, the moveable keypad 402 is orientated in a manner that enables a user to have a desirable viewing of the moveable keypad 402 and the screen (e.g., an item to be scanned is above the scanning component 410). Turning briefly to FIG. 5, the machine data reader 400 is illustrated at a disparate orientation. The moveable keypad 402 has been positioned in a manner that provides a user with a desirable viewing of such keypad in relation to the orientation of the machine data reader 400. Conventional machine data readers would require the user to rotate their eye-line to the left to quickly read the moveable keypad 402. Moreover, the display 404 would likewise be rotated 90 degrees to the left compared to an optimal eye-line of the user. Utilizing the present invention, however, the user can simply translate the moveable keypad 402 to a desirable position for viewing such keypad 402. Thereafter, the display 404 will likewise automatically translate to a position corresponding to the position of the moveable keypad 402. Thus, even though the machine data reader 400 has been rotated 90 degrees counterclockwise, the keypad 402 and the display 404 are in an optimal viewing position.

Figure 6:
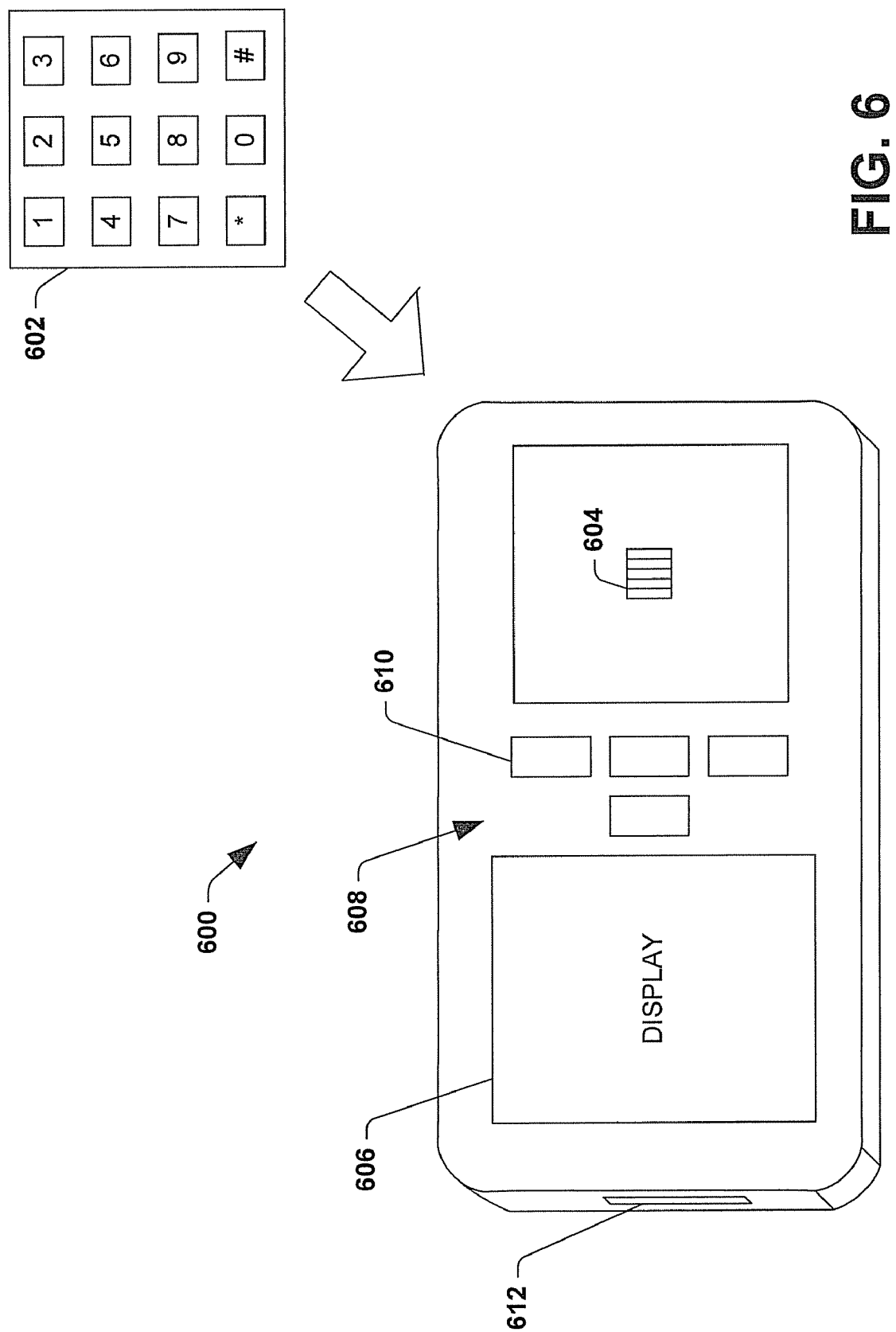
FIG. 6 illustrates an exemplary machine data reader with a moveable keypad in accordance with an aspect of the present invention.

Turning now to FIG. 6, an exemplary machine data reader 600 that can employ one or more aspects of the present invention is illustrated. For instance, the data machine reader 600 can be a portable barcode scanner. The data machine reader 600 is associated with a moveable keypad 602 that can be removed from the machine data reader 600 and replaced at a disparate orientation in relation to the machine data reader. The machine data reader 600 further comprises a multi-position connector 604 that enables connection of the moveable keypad 602 in four disparate positions. Furthermore, different physical connections exist between the multi-position connector 604 and the moveable keypad 602 when the moveable keypad 602 is placed at different orientations with respect to the machine data reader. Therefore a particular orientation of the moveable keypad 602 can be effectively sensed by monitoring the physical connection between the multi-position connector 604 and the moveable keypad 602.

Upon sensing the orientation of the moveable keypad 602, an orientation of a display 606 is automatically rendered in a position corresponding to a position of the moveable keypad 602. The moveable keypad 602 further includes various keys that can be utilized to enter data into the machine data reader 600 relating to items that have been previously scanned, are currently being scanned, and/or that will be scanned at a future time. While the keypad 602 is shown to be similar to a keypad found on a phone, it is to be understood that any suitable keypad configuration can be employed on the machine data reader 600. The machine data reader 600 also includes various keys 608 that are not moveable. For instance, the keys 608 can include a power key, keys that can be employed to scroll through a menu, or other suitable actions relating to operating the machine data reader 600. Furthermore, operability of the keys can automatically alter based upon a sensed orientation of the moveable keypad 602. More particularly, a key 610 can be utilized to scroll upward through a menu when the moveable keypad 602 is in a first position. Thereafter if the moveable keypad 602 is placed at a 180-degree rotation from the first position, the key 610 can be utilized to scroll downward through a menu. The machine data reader 600 can also include a scanner 612 that is utilized to scan particular symbols in connection with obtaining data relating to an item. A location of the scanner 612 in connection with a location of an item desirably scanned can be determinative of a desirably orientation of the moveable keypad 602 and the display 604.

Figure 7:
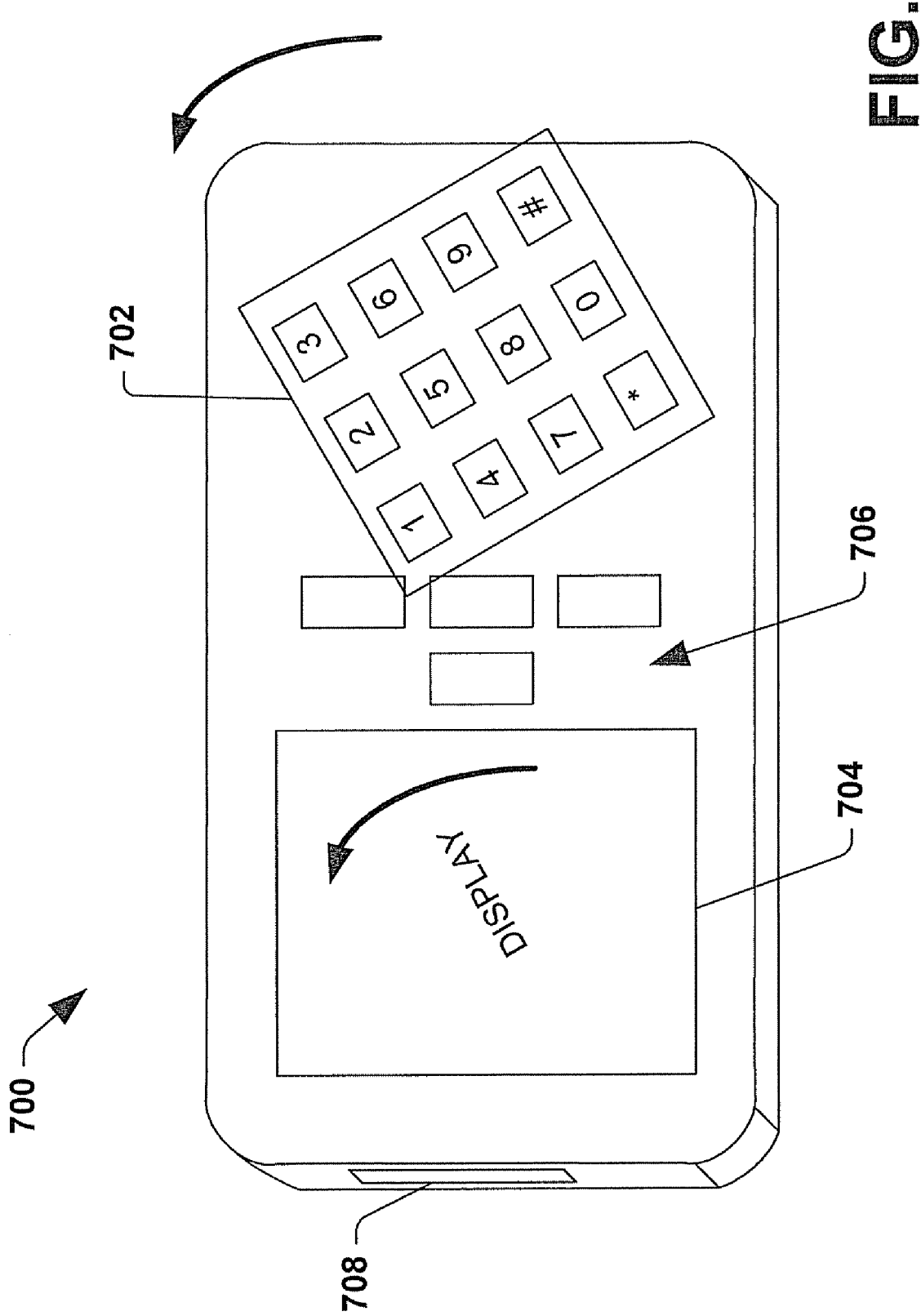
FIG. 7 illustrates an exemplary machine data reader with a rotating keypad in accordance with an aspect of the present invention.

Now referring to FIG. 7, an exemplary machine data reader 700 in accordance with an aspect of the present invention is illustrated. The machine data reader 700 includes a moveable keypad 702 that can be rotated relative to the machine reader 700. For example, the moveable keypad 702 can be released from a locking mechanism (not shown) that allows the moveable keypad 702 to be rotated to a desirable position. One or more sensors (not shown) can be utilized to determine an orientation of the moveable keypad 702 relative to the machine data reader 700. A display is dynamically orientated based at least in part upon sensed orientation of the moveable keypad 702. For example, if the moveable keypad 702 is rotated at an angle 45-degrees counterclockwise of an initial position, the display 704 will be rotated correspondingly. In accordance with one aspect of the present invention, a user will not be able to utilize the moveable keypad 702 while it is in an unlocked position and being rotated, ensuring that keys are not accidentally depressed when rotating the moveable keypad 702 to a desirable position. Upon locking the moveable keypad 702 in a desirable position, the user will again be able to utilize keys of the moveable keypad 702 to enter data into the machine data reader 700.

Various other keys 706 that are not moveable can be provided to enter data into the machine data reader 700. For example, the keys 706 can be employed to scroll through menus, turn power on and/or off, and other suitable functions. Furthermore, operability of the keys 706 can be altered according to position of the moveable keypad 702. For example, if the moveable keypad 702 is rotated from an initial position past a pre-defined threshold rotation, operability of the keys 706 can change. Such an aspect enables a user to have optimal operability of the machine data reader 700, and can reduce errors that occur in connection with entering information into the machine data reader 700. The machine data reader 700 can further comprise a scanner 708 that is provided to emit and/or receive light in connection with reading barcode symbols or other similar indicia.

Figure 8:
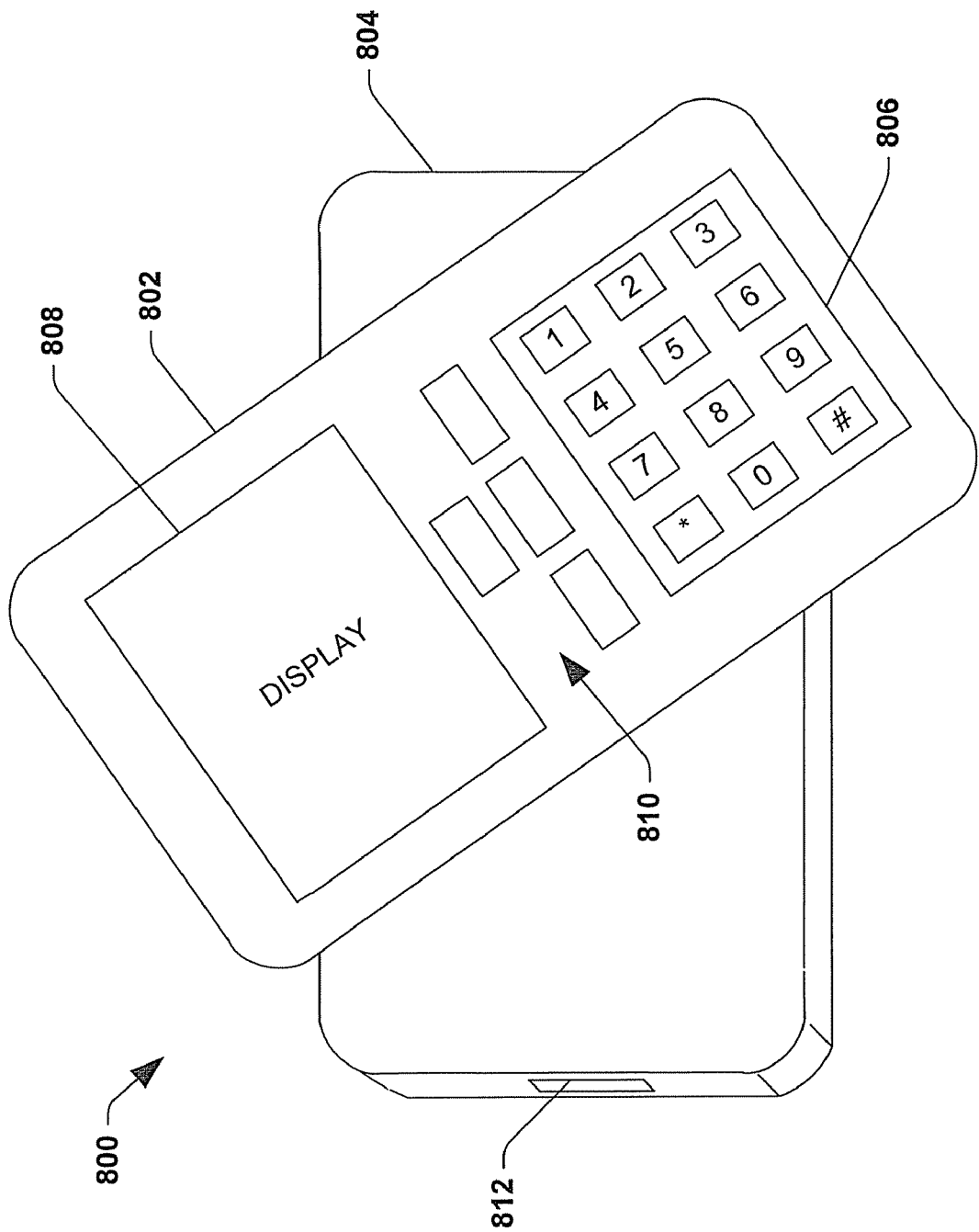
FIG. 8 illustrates an exemplary machine data reader with a detachable face in accordance with an aspect of the present invention.

Turning now to FIG. 8, an exemplary barcode scanner 800 in accordance with an aspect of the present invention is illustrated. The barcode scanner 800 includes a detachable face 802 that can be detached from a body 804 of the barcode scanner 800 and re-attached at a rotation of 180 degrees from an initial position. The detachable face 802 includes a moveable keypad 806 that can be oriented according to user preference. The detachable face 802 further includes a display 808 that is automatically oriented upon a sensed orientation of the moveable keypad 806. For example, if the moveable keypad 806 is translated clockwise at an angle of 90 degrees relative to the detachable face 802 from an initial position, then the display 806 will likewise be translated clockwise approximately 90 degrees relative to the detachable face 802. The barcode scanner 800 further includes various keys 810 that are not moveable with respect to the detachable face 802, wherein the keys 810 can be employed in connection with relaying information to the barcode scanner 800. In accordance with one aspect of the present invention, operability of the keys 810 is defined by a sensed orientation of the detachable face 802 and the moveable keypad 806. More particularly, operation of the keys 810 can change when the detachable face 802 is rotated 180 degrees. Operability of the keys 810 can further change when the moveable keypad 806 or translated with respect to the detachable face 802. This ensures that utilization of the keys 810 is intuitive to a user.

The barcode scanner also includes a scanning component 812 that facilitates emitting and/or receiving light in connection with reading a barcode symbol. Employment of the detachable face 802 can be beneficial in an instance that a user desires the display 808 to be at a particular location relative to the scanning component 812. For instance, if the scanning component 812 is on a left side of the body 804 of the barcode scanner 800 and a user is right-handed, such user will desire the display 808 to be located near the scanning component 812 to ensure that his hand will not partially obstruct his line of sight to the display 808. Thereafter the moveable keypad 806 can be rotated to place such moveable keypad 806 in a desirable position for keying information into the barcode scanner 800, and the display 808 will be rendered corresponding to a position of the moveable keypad 806.

Figure 9:
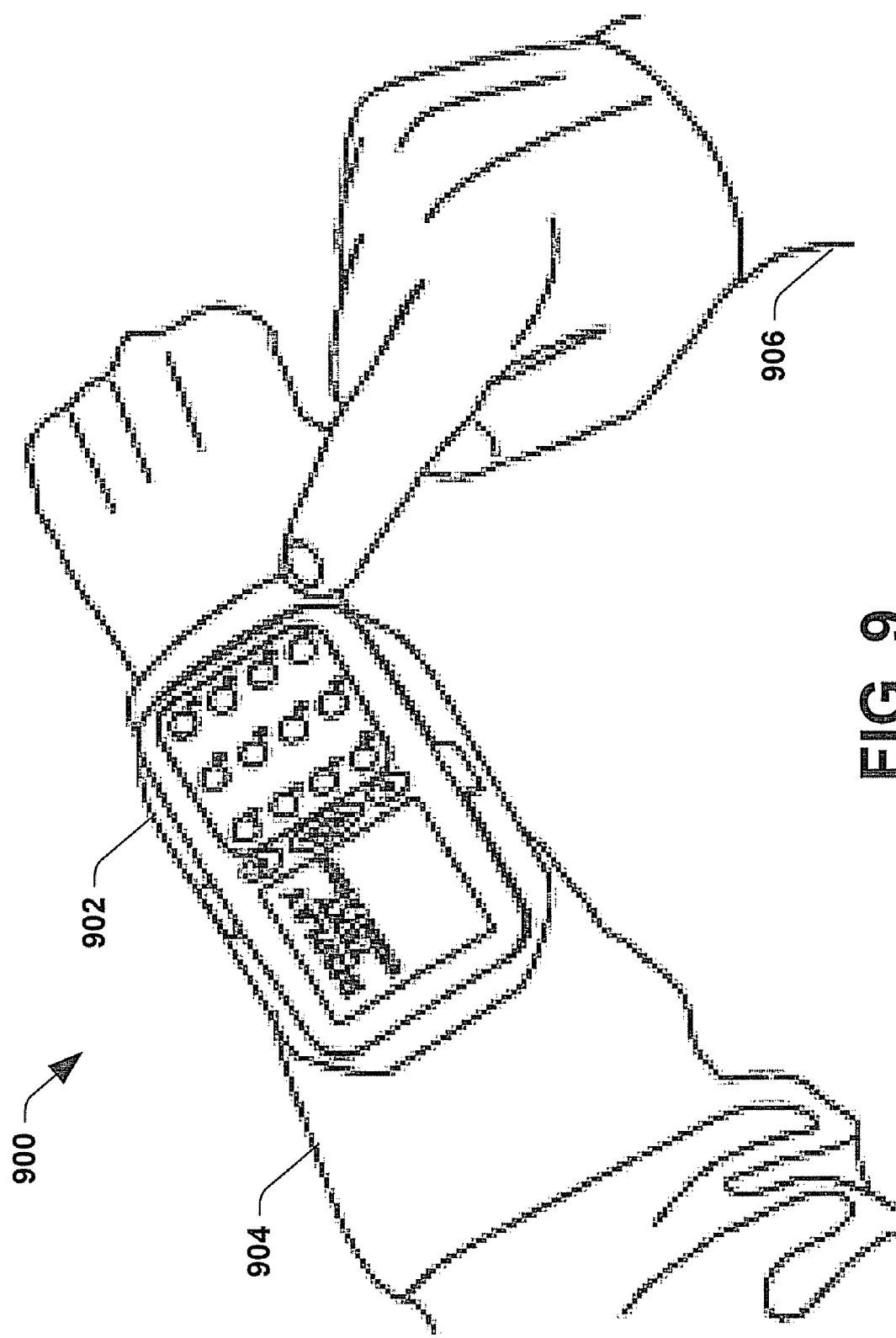
FIG. 9 illustrates an exemplary environment in which the present invention can be employed.

Now referring to FIG. 9, an exemplary utilization 900 of a barcode scanner 902 in accordance with an aspect of the present invention is illustrated. The barcode scanner 900 is situated on a left arm 904 of an individual who is utilizing the barcode scanner 900. For instance, a strap or other suitable attaching mechanism can be employed to situate the barcode scanner 900 on the arm 904 of the individual. A scanning component (not shown) will emit and/or receive light parallel to a left arm 904 of the individual in a direction away from such individual's body. The individual is desirably entering information into the barcode scanner 900 with a right arm 906. As the keypad is located toward the individual's wrist on the left arm 904, the individual's hand on the right arm 906 will not obstruct the individual's line of sight.

Figure 10:
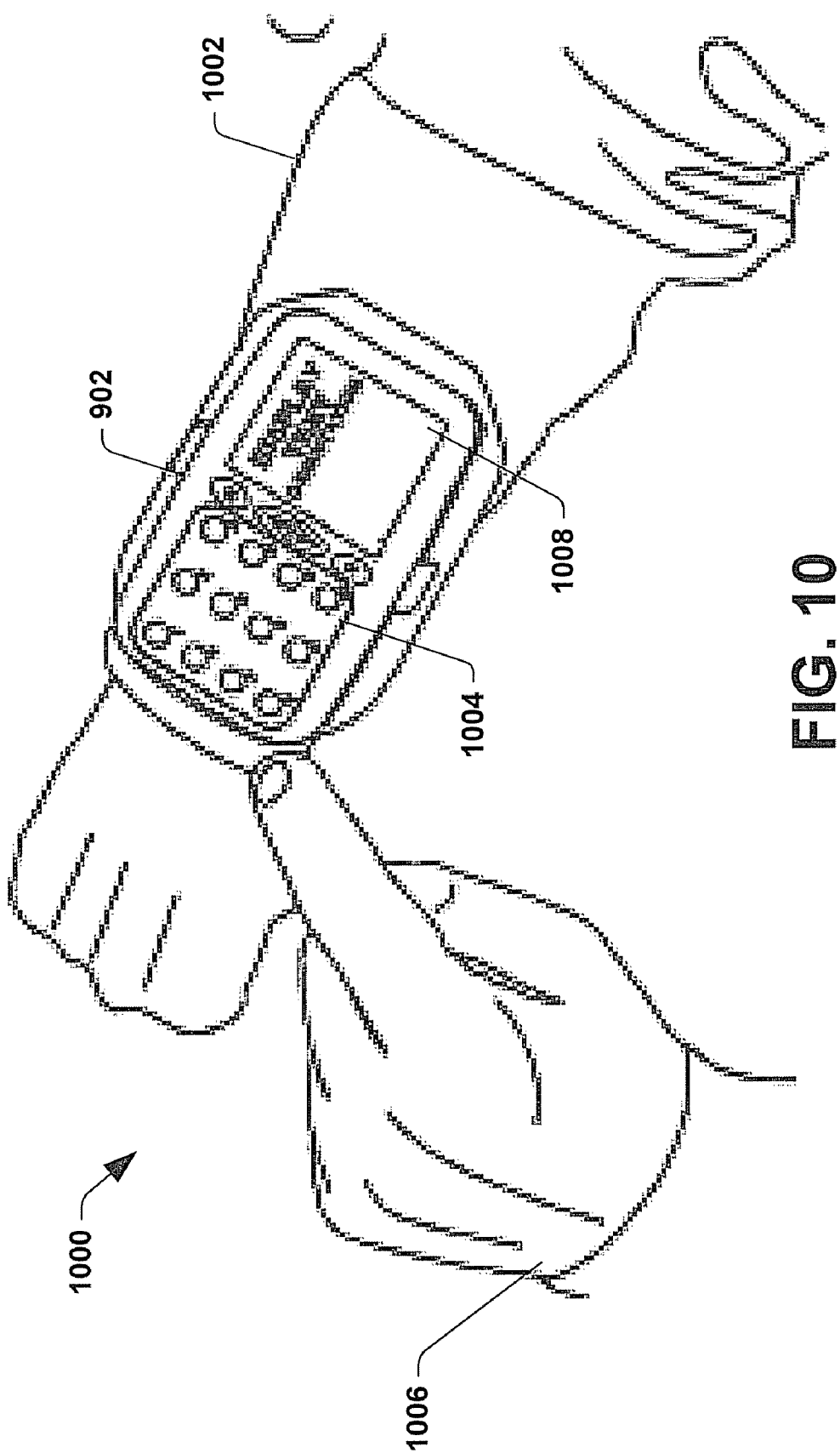
FIG. 10 illustrates an exemplary environment in which the present invention can be employed.

Turning now to FIG. 10, a utilization 1000 of the barcode scanner 902 illustrated in FIG. 9 is illustrated. The barcode scanner 902 has been placed on an individual's right arm 1002 (rather than a left arm). Prior to the present invention, a keypad 1004 on the barcode scanner 902 would be at an orientation that is 180 degrees translated from a desirable orientation. Alternatively, the barcode scanner 902 would be positioned in a backward orientation on the right arm 1002, causing difficulty in scanning items and further requiring a left arm 1006 to obstruct a line of sight of a user when entering information. The present invention enables the keypad 1004 to be placed at a disparate orientation relative to the barcode scanner 902. Furthermore, a display 1008 is automatically oriented corresponding to a sensed position of the keypad 1004. Thus, the user will be able to optimally view the keypad 1004 and the display 1008 of the barcode scanner 902 without sacrificing usability of the barcode scanner 902, and further without requiring purchase of an additional barcode scanner that is customized for a particular arm.

Figure 11:
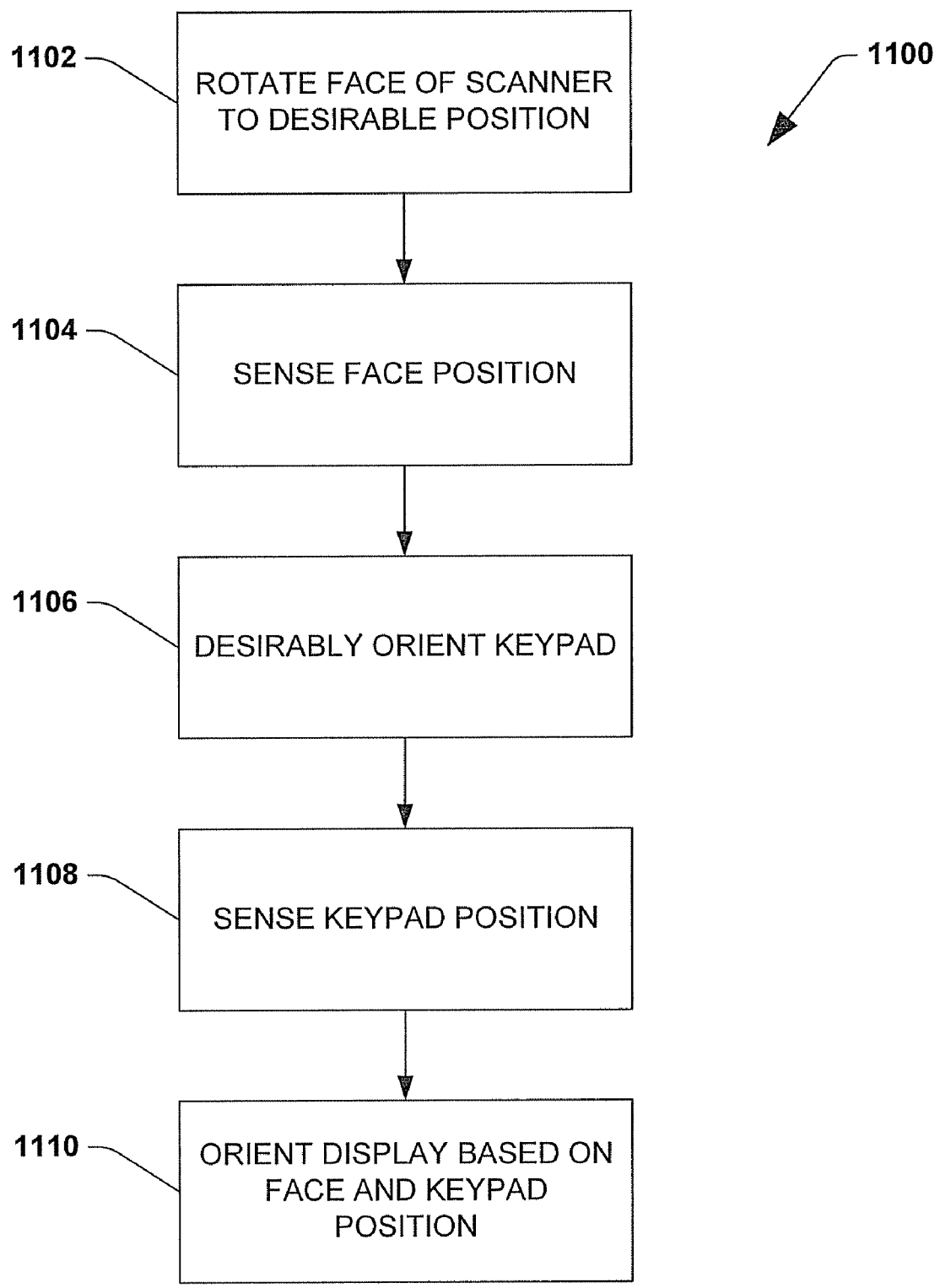
FIG. 11 is a representative flow diagram that illustrates a method for orienting a display of a barcode scanner based upon an orientation of a detachable face and an orientation of a moveable keypad in accordance with an aspect of the present invention.

Now referring to FIG. 11, a methodology 1100 for customizing a machine data reader is illustrated. At 1102 a detachable face of a machine data reader is rotated to a desirable position. The detachable face can include a display, a moveable keypad, one or more keys that are not moveable, and other suitable elements that can be found on typical machine data readers. The detachable face can be placed in a plurality of positions. For example, if the machine data reader is substantially square in shape, the detachable face can be positioned in at least four disparate positions. Furthermore, if the machine data reader is circular, the detachable face could be positioned in a substantial number of positions. A detachable face may be desirable when positioning a display and keypad in a particular position relative to a scanning component is desirable.

At 1104, a position of the detachable face is sensed. For instance, if the detachable face can be connected in only a small number of orientations, a different physical connection between the detachable face and a body of the machine data reader can be utilized to determine an orientation of the detachable face. In accordance with another aspect of the present invention, one or more position sensors can be employed to determine an orientation of the detachable face relative to the body of the machine data reader. At 1106, a moveable keypad is oriented by a user according to user preference for a particular application. For example, if a first user is wearing the machine data reader on a right arm and a second user desires to wear the machine data reader on a left arm, then the moveable keypad would be desirably rotated approximately 180 degrees to enable the moveable keypad to be desirably oriented to the second user's sightline.

At 1108 an orientation of the keypad relative to the detachable face is sensed. The orientation of the keypad can be determined in a manner substantially similar to that discussed above with respect to determining an orientation of the detachable face. At 1110, a display on the detachable face is automatically oriented based at least in part upon a sensed position of the detachable face and a sensed position of the keypad. Such automatic orientation facilitates rendering the display in a manner that is desirable by a user according to orientation of the detachable face and the keypad.

Figure 12:
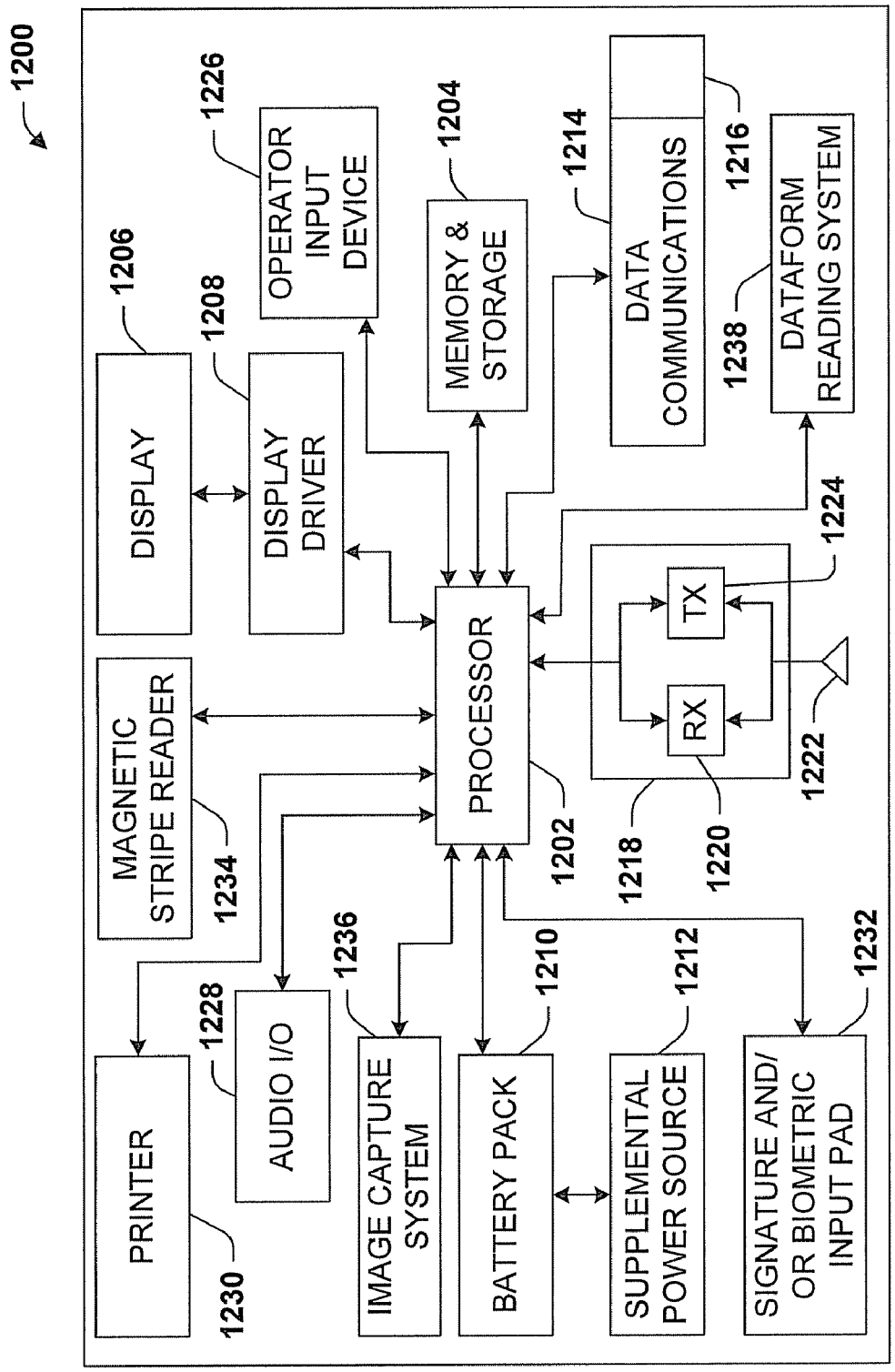
FIG. 12 is a schematic diagram of a barcode scanner in accordance with an aspect of the present invention.

Referring now to FIG. 12, there is illustrated a schematic block diagram of an exemplary portable machine data reading device 1200 according to one aspect of the present invention, in which a processor 1202 is responsible for controlling the general operation of the device 1200. The processor 1202 is programmed to control and operate the various components within the device 1200 in order to carry out the various functions described herein. The processor 1202 may be any of a plurality of suitable processors. The manner in which the processor 1202 can be programmed to carry out the functions relating to the present invention will be readily apparent to those having ordinary skill in the art based on the description provided herein.

A memory 1204 connected to the processor 1202 serves to store program code executed by the processor 1202, and also serves as a storage means for storing information such as receipt transaction information and the like. The memory 1204 may be a non-volatile memory suitably adapted to store at least a complete set of the information that is displayed. Thus the memory 1204 may include a RAM memory for high-speed access by the processor 1202 and/or a mass storage memory, e.g., a micro drive capable of storing gigabytes of data that comprises text, images, audio, and video content. According to one aspect, the memory 1204 has sufficient storage capacity to store multiple sets of information, and the processor 1202 could include a program for alternating or cycling between various sets of display information.

A display 1206 is coupled to the processor 1202 via a display driver system 1208. The display 1206 may be a color liquid crystal display (LCD) or the like. In this example, the display 1206 is a ¼ VGA display with sixteen levels of gray scale. The display 1206 functions to present data, graphics, or other information content. For example, the display 1206 may display a set of customer information, which is displayed to the operator and may be transmitted over a system backbone (not shown). Additionally, the display 1206 may display a variety of functions that control the execution of the device 1200. The display 1206 is capable of displaying both alphanumeric and graphical characters.

Power is provided to the processor 1202 and other components forming the hand-held device 1200 by an onboard battery system 1210. In the event that the battery system 1210 fails or becomes disconnected from the device 1200, a supplemental power source 1212 can be employed to provide power to the processor 1202 and to charge the battery system 1210. The processor 1202 of the mobile device 1200 induces a sleep mode to reduce the current draw upon detection of an anticipated battery failure.

The mobile terminal 1200 includes a communication subsystem 1214 that includes a data communication port 1216, which is employed to interface the processor 1202 with a remote computer. The port 1216 includes at least the USB and IEEE 1394 serial communications capabilities described hereinabove. Other technologies may also be included, for example, infrared communication utilizing an IrDA port.

The mobile device 1200 also includes an RF transceiver section 1218 in operative communication with the processor 1202. The RF section 1218 includes an RF receiver 1220, which receives RF signals from a remote device via an antenna 1222 and demodulates the signal to obtain digital information modulated therein. The RF section 1218 also includes an RF transmitter 1224 for transmitting information to a remote device, for example, in response to manual user input via a user input device 1226 (e.g., a keypad) or automatically in response to the completion of a transaction or other predetermined and programmed criteria. The transceiver section 1218 facilitates communication with a transponder system, either passive or active, that is in use with product or item RF tags. The processor 1202 signals (or pulses) the remote transponder system via the transceiver 1218, and detects the return signal in order to read the contents of the tag memory. The RF section 1218 further facilitates telephone communications using the device 1200. In furtherance thereof, an audio I/O section 1228 is provided as controlled by the processor 1202 to process voice input from a microphone (or similar audio input device) and audio output signals (from a speaker or similar audio output device). In further support thereof, the device 1200 may provide voice recognition capabilities such that when the device 1200 is used simply as a voice recorder, the processor 1202 may facilitate high-speed conversion of the voice signals into text content for local editing and review, and/or later download to a remote system, such as a computer word processor. Similarly, the converted voice signals may be used to control the device 1200 instead of using manual entry via the keypad.

Onboard peripheral devices, such as a printer 1230, signature and/or biometric input pad 1232, and a magnetic stripe reader 1234 can also be provided within the housing of the device 1200 or accommodated externally through one or more of the external port interfaces 1216.

The device 1200 also includes an image capture system 1236 such that the user may take pictures and/or short movies for storage by the device 1200 and presentation by the display 1206. Additionally, a data form reading system 1238 is included for scanning data forms associated with articles of commerce. It is to be appreciated that these imaging systems (1236 and 1238) may be a single system capable of performing both functions.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates orientation of a display on a machine data reader, comprising:
   a detachable face comprising a display and a moveable keypad, the detachable face rotatable from an original orientation to a disparate orientation along an axis normal to a plane of the machine data reader, the movable keyboard is capable of rotating in multiple orientations in relation to the detachable face;
   a component that senses the disparate orientation of the detachable face;
   one or more keys not movable with respect to a body of the detachable face;
   a multi-position connector that enables connection of the moveable keypad in multiple positions relative to the detachable face;
   a component that senses a disparate position of the moveable keypad by monitoring a physical connection between the multi-position connector and the moveable keypad; and
   a component that automatically orients the display based upon the sensed disparate position of the moveable keypad and the sensed disparate orientation of the detachable face.

2. The system of claim 1, wherein the one or more keys that are not movable with respect to the body of the detachable face are employed to enter information into the machine data reader, the operability of the one or more keys depending upon the sensed position of the movable keypad.

3. The system of claim 1, further comprising a customization component that facilitates user-customization of the display based upon the sensed disparate position of the movable keypad.

4. The system of claim 3, the customization component customizes size of at least one of text and imagery of the display.

5. The system of claim 3, the customization component associated with an artificial intelligence component that infers a desirable display orientation based upon one or more of user identification, user history, and current application.

6. The system of claim 1, the machine data reader being a wearable barcode scanner.

7. The system of claim 6, wherein the wearable barcode scanner includes a scanning component that facilitates emitting and receiving light in connection with reading a barcode symbol.

8. The system of claim 1, further comprising a mechanism that locks the keypad in a desirable position.

9. The system of claim 8, the keypad inoperative when the keypad is not locked in a desirable position.

10. The system of claim 1, further comprising a data store that contains one or more profiles, the profiles related to individual users and comprising information related to user preferences, and the display oriented based at least in part upon a profile.

11. The system of claim 10, wherein the data store stores information related to items scanned.

12. The system of claim 11, wherein the information related to the items scanned includes at least one of product identification information, price information, or inventory information.

13. A method for displaying data on a machine data reader, comprising:
   providing a detachable face with a display and a movable keypad,
   rotating the detachable face from an original orientation to a disparate orientation along an axis normal to a plane of the machine data reader;
   sensing the disparate orientation of the detachable face;
   providing one or more keys that are not movable with respect to a body of the detachable face;
   providing a multi-position connector that enables positioning of the movable keypad in four disparate positions relative to the detachable face;
   sensing a disparate position of the movable keypad by monitoring a physical connection between the multi-position connector and the movable keypad; and
   orienting a display based upon the sensed disparate position of the movable keypad and the sensed disparate orientation of the detachable face.

14. The method of claim 13, further comprising customizing the display based upon user-preference.

15. The method of claim 14, further comprising customizing the display based on one or more of user history, user identification, and current application.

16. The method of claim 13, further comprising storing one or more profiles in a data store, the profiles related to individual users and comprise information related to user preferences, and the display oriented based at least in part upon a profile.

17. The method of claim 16, wherein the data store stores information related to items scanned, wherein the information related to the items scanned includes at least one of product identification information, price information, or inventory information.

18. The method of claim 13, the machine data reader being a wearable barcode scanner that includes a scanning component that facilitates emitting and receiving light in connection with reading a barcode symbol.

19. The method of claim 13, further comprising altering operability of the non-movable keys based upon the sensed disparate position of the movable keypad.

* * * * *